(12) United States Patent
Rink et al.

(10) Patent No.: US 7,064,156 B2
(45) Date of Patent: *Jun. 20, 2006

(54) CONTINUOUS METHOD FOR THE PRODUCTION OF POWDER PAINT SUSPENSIONS (POWDER SLURRIES) AND POWDER PAINTS

(75) Inventors: Heinz-Peter Rink, Munster (DE); Werner-Alfons Jung, Ascheberg (DE); Michael Stang, Ludwigshafen (DE); Heik Wolf, Frankenthal (DE)

(73) Assignee: BASF Coatings AG, Munster (DE)

( * ) Notice: Subject to any disclaimer, the term of this patent is extended or adjusted under 35 U.S.C. 154(b) by 273 days.

This patent is subject to a terminal disclaimer.

(21) Appl. No.: 10/474,859

(22) PCT Filed: May 24, 2002

(86) PCT No.: PCT/EP02/05700

§ 371 (c)(1),
(2), (4) Date: Oct. 13, 2003

(87) PCT Pub. No.: WO02/098994

PCT Pub. Date: Dec. 12, 2002

(65) Prior Publication Data

US 2004/0082708 A1     Apr. 29, 2004

(30) Foreign Application Priority Data

Jun. 1, 2001   (DE) ................................ 101-26-649

(51) Int. Cl.
C08J 3/05         (2006.01)

(52) U.S. Cl. ........................ 523/335; 523/402; 523/340

(58) Field of Classification Search .................. 525/50; 524/556; 523/340, 335, 402
See application file for complete search history.

(56) References Cited

U.S. PATENT DOCUMENTS

| | | | | |
|---|---|---|---|---|
| 4,056,653 A | | 11/1977 | Gebhard, Jr. et al. ....... 428/402 |
| 5,928,577 A | | 7/1999 | Kodokian .................... 264/15 |
| 6,184,270 B1 | | 2/2001 | Beckman et al. ........... 523/309 |
| 6,204,310 B1 | | 3/2001 | Choudhery ................. 523/348 |
| 6,228,897 B1 | * | 5/2001 | Daly et al. .................... 521/79 |
| 6,291,579 B1 | * | 9/2001 | Kalck et al. ................. 524/832 |
| 6,441,078 B1 | * | 8/2002 | Doessel et al. ............. 524/442 |
| 6,737,468 B1 | * | 5/2004 | Bremser ...................... 524/547 |
| 2001/0012863 A1 | * | 8/2001 | Choudhery ................. 523/402 |
| 2003/0100667 A1 | | 5/2003 | Cendix et al. .............. 524/558 |
| 2004/0082715 A1 | * | 4/2004 | Bayer et al. .................. 525/50 |
| 2004/0110892 A1 | * | 6/2004 | Berg et al. ................. 524/543 |
| 2004/0132902 A1 | * | 7/2004 | Bremser ...................... 524/800 |

FOREIGN PATENT DOCUMENTS

| | | |
|---|---|---|
| CA | 2377757 | 6/2000 |
| CA | 2377759 | 6/2000 |
| CA | 2377924 | 6/2000 |
| DE | 196 52 813 | 6/1998 |
| DE | 199 30 067 | 1/2001 |
| DE | 199 30 664 | 1/2001 |
| DE | 199 30 665 | 1/2001 |
| DE | 100 06 673.9 | 9/2001 |
| DE | 100 18 581.9 | 2/2002 |
| WO | WO 97/45476 | 12/1997 |
| WO | WO 9827141 A2 * | 6/1998 |
| WO | WO 98/45356 | 10/1998 |
| WO | WO 00/17256 | 3/2000 |

OTHER PUBLICATIONS

English Abstract for DE 100 18 581.

* cited by examiner

*Primary Examiner*—David W. Wu
*Assistant Examiner*—Satya B. Sastri

(57) ABSTRACT

Powder coating materials prepared by
(1) mixing at least two liquid components comprising in each case at least one liquid starting product in a static mixer, to give a molecularly disperse and/or finely dispersed liquid mixture,
(2) emulsifying the liquid mixture (1) in an aqueous medium in a dispersing unit, to give an aqueous emulsion of liquid particals,
(3) cooling the emulsion (2) so that a suspension of dimensionally stable particles is formed,
(4) isolating the dimensionally stable particles from the suspension (3)
or alternatively
(3) isolating the dimensionally stable particles directly from the emulsion (2);
and also processes for preparing them and their use as coating materials, adhesives, and sealing compounds or to prepare such compositions.

26 Claims, No Drawings

CONTINUOUS METHOD FOR THE PRODUCTION OF POWDER PAINT SUSPENSIONS (POWDER SLURRIES) AND POWDER PAINTS

CROSS REFERENCE TO RELATED APPLICATIONS

This application is a National Phase Application of Patent Application PCT/EP02/05700 filed on 24 May 2002, which claims priority to DE 101 26 649.9, filed on 1 Jun. 2001.

The present invention relates to novel powder coating materials, preparable by emulsification of liquid components. It also relates to a process for preparing novel powder coating materials by emulsification of liquid components. The present invention additionally relates to the use of the novel powder coating materials as coating materials, adhesives, and sealing compounds for coating, bonding, and sealing motor vehicle bodies and parts thereof, the interior and exterior of motor vehicles, the inside and outside of buildings, doors, windows, and furniture, and for coating, bonding, and sealing in the context of industrial coating, particularly of small parts, coils, containers, packaging, electrical components, and white goods.

Powder coating materials in the form of aqueous suspensions (powder slurries) which are substantially free from organic solvents and may be processed using liquid coating technologies, and processes for preparing them by melt emulsification, are known from the German patent application DE 196 52 813 A1. In this known process, the binders, the crosslinking agents, and any further additives are fed in the form of viscous resin melts into the dispersing apparatus, in which they are dispersed finely in the liquid phase. Alternatively, before their dispersing in the dispersing apparatus in the liquid state, the ingredients may first of all be mixed homogeneously with one another and then, in a second step, dispersed finely in the liquid phase. Thereafter, the resulting emulsion is converted by cooling into a suspension containing solid, finely divided particles.

The isolation of the dispersed or suspended powder coating particles is not revealed in the German patent application.

According to column 7 lines 4 to 9 of DE 196 52 813 A1, use may be made as stabilizers, dispersants or emulsifiers of short-chain amphiphilic polyacrylates prepared from acrylic acid, ethylhexyl acrylate, hydroxyethyl acrylate and an anionic comonomer in lyotropic phase by means of transfer polymerization. The surface tension of aqueous solutions of the emulsifiers at the critical micelle concentration (CMC), however, is not specified.

Powder slurries prepared by melt emulsification are also described in the German patent applications DE 100 06 673.9 and DE 100 18 581.9, unpublished at the priority date of the present specification. However, the resulting dispersed powder coating particles are not isolated and used as powder coating materials. Emulsifiers used include nonionic emulsifiers such as alkoxylated alkanols and polyols, phenols and alkylphenols, or anionic emulsifiers such as alkali metal salts or ammonium salts of alkanecarboxylic acids, alkanesulfonic acids, and sulfo acids of alkoxylated alkanols and polyols, phenols and alkylphenols. The surface tension of aqueous solutions of the emulsifiers at the critical micelle concentration (CMC), however, is not specified.

A process for preparing powder coating materials by melt emulsification is known from the international patent application WO 97/45476.

According to page 13 lines 5 to 20 of the international patent application, emulsifiers are used in the process. In the case of an aqueous phase, polyethylene glycol or polyvinyl alcohol is used. The key factor is that the emulsifiers have an anchor component which links the emulsifiers to the melt by means of physical adsorption or chemical reaction. Examples of suitable anchor components are polar (meth) acrylate copolymers or the corresponding groups. The surface tension of aqueous solutions of the emulsifiers at the critical micelle concentration (CMC), however, is not specified.

For the known process it is important that the starting products of the powder coating materials are melted in an extruder and mixed with one another. Still in the extruder, the resulting melt is mixed with water. A disadvantage of this known process is that the temperatures and the residence times in the extruder must be set precisely in order to prevent premature crosslinking of binders and crosslinking agents.

Another process for preparing powder slurries by melt emulsification is known from the international patent application WO 98/45356.

In this case ionic and nonionic emulsifiers (surfactants) are used. Ionic emulsifiers used include the in situ reaction products of the carboxyl-containing olefin copolymers used in the process with ammonium hydroxide, triethanolamine, morpholine, and dimethylethanolamine. Preferred nonionic emulsifiers are alkylphenol thioxylates and ethylene oxide-propylene glycol copolymers. The surface tension of aqueous solutions of the emulsifiers at the critical micelle concentration (CMC), however, is not specified.

In the known process, the starting products are melted in an extruder and mixed with one another. The melt is subsequently introduced into an autoclave, in which it is emulsified. The emulsions of the melted particles are thereafter stirred under pressure at temperatures above their melting point in order to make them spherical. According to page 4 lines 20 to 23 of the international patent application, at least 30 seconds are required for this purpose.

A comparable process is disclosed by the American patent U.S. Pat. No. 4,056,653 A. According to column 2 lines 6 to 9 of the patent, at least 30 seconds are likewise required for said process step.

A disadvantage of this known process is that during the comparatively long treatment time even slight changes in the process conditions may be accompanied by unwanted agglomeration of the melted particles.

The known processes described above for preparing powder coating materials by melt emulsification have the further disadvantage that the extruders used as mixing equipment have a comparatively low efficiency, so that a comparatively high energy input is necessary in order to produce a homogeneous melt. Moreover, the emulsifiers employed are only able to effect adequate stabilization of either the emulsified melted particles formed to start with or the suspended solid particles which result after cooling of the emulsion, but not both simultaneously. With the known processes, therefore, there is the risk that they will react adversely even to slight variations in the process conditions and will not produce powder coating materials that meet the specification.

The International Patent Application WO 00/17256 discloses yet another process for preparing powder coating materials by melt emulsification. In this process the starting products, especially the binders, are dispersed in fluids such as sulfur hexafluoride, fluoroform and/or xenon under supercritical or near-supercritical conditions. The fluids are selected in such a way that the binders are slightly swollen.

Moreover, the density of the fluids is adapted to the density of the starting products by varying pressure and temperature. A prerequisite for this process are the supercritical or near-supercritical conditions. The powder coating materials are recovered by pressure relief. This process necessitates expensive pressure-rated plant and the use of compounds which are known to induce an extremely high greenhouse gas effect (cf. the international patent application on page 15 lines 28 and 29).

The use of dispersions of copolymers preparable in aqueous media by single-stage or multistage free-radical copolymerization of
a) at least one olefinically unsaturated monomer and
b) at least one olefinically unsaturated monomer different than the olefinically unsaturated monomer (a) and of the general formula I

$$R^1R^2C=CR^3R^4 \quad (I)$$

in which the radicals $R^1$ $R^2$, $R^3$, and $R^4$ each independently of one another are hydrogen atoms or substituted or unsubstituted alkyl, cycloalkyl, alkylcycloalkyl cycloalkylalkyl, aryl, alkylaryl, cycloalkylaryl, arylalkyl or arylcycloalkyl radicals with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals, as binders in coating materials, especially aqueous basecoat materials (cf. the German patent application DE 199 30 665 A1), primer-surfacers and antistonechip primers (cf. the German patent application DE 199 30 067 A1), and clearcoat materials (cf. the German patent application DE 199 30 664 A1) is known. Their use as stabilizers, emulsifiers or dispersants is not described in the patent applications.

It is an object of the present invention to find novel powder coating materials preparable by an emulsification process, simply, reliably, rapidly and reproducibly with short residence times in the plant in question, said coating materials reliably meeting the given specifications.

It is a further object of the present invention to find a novel process for preparing powder coating materials which no longer has the disadvantages of the prior art but which instead rapidly provides on-specification powder coating materials simply, reliably, and reproducibly with short residence times in the plant in question.

The invention accordingly provides the novel powder coating materials preparable by
(1) mixing at least two liquid components comprising in each case at least one liquid starting product in a static mixer, to give a molecularly disperse and/or finely dispersed liquid mixture,
(2) emulsifying the liquid mixture (1) in an aqueous medium in a dispersing unit, to give an aqueous emulsion of liquid particles,
(3) cooling the emulsion (2) so that a suspension of dimensionally stable particles is formed, and
(4) isolating the dimensionally stable particles from the suspension (3)

or alternatively
(3) isolating the dimensionally stable particles directly from the emulsion (2).

In the text below, the novel powder coating materials are referred to as "powder coating materials of the invention".

The invention also provides the novel process for preparing powder coating materials, which involves (1) mixing at least two liquid components each comprising at least one liquid starting product in the melted state in a static mixer to give a molecularly disperse or finely dispersed liquid mixture,
(2) emulsifying the liquid mixture (1) in a dispersing unit in an aqueous medium, to give an aqueous emulsion of liquid particles,
(3) cooling the emulsion (2), so that a suspension of dimensionally stable particles is formed, and
(4) isolating the dimensionally stable particles (3) from the suspension or alternatively
(3) isolating the dimensionally stable particles directly from the emulsion (2).

In the text below, the novel process for preparing powder coating materials is referred to as the "process of the invention".

Further subject matter of the invention, processes and uses will emerge from the description.

In the light of the prior art it was surprising and unforeseeable for the skilled worker that the object on which the present invention was based could be achieved by means of the process of the invention and the powder coating materials of the invention. More surprising still was that it was the copolymers of the monomers (a) and (b), hitherto used only as binders, that had the properties required for them to be considered for the process of the invention. Surprising not least was the fact that, for a comparatively low energy input and very short residence times, the process of the invention could give on-specification powder coating materials of the invention even without aftertreatment of the emulsified melted particles.

The starting products used in the process of the invention for preparing the powder coating materials of the invention are selected with a view to the desired composition and the curing mechanism of the powder coating materials of the invention.

The powder coating materials of the invention may be physically curing.

In the context of the present invention the term "physical curing" denotes the curing of a layer of particles of the powder coating materials of the invention by filming, with linking within the coating taking place by looping of the polymer molecules of the binders (regarding the term cf. Römpp Lexikon Lacke und Druckfarben, Georg Thieme Verlag, Stuttgart, New York, 1998, "binders", pages 73 and 74). Or else filming takes place by way of the coalescence of binder particles (cf. Römpp Lexikon Lacke und Druckfarben, Georg Thieme Verlag, Stuttgart, New York, 1998, "curing", pages 274 and 275). Normally, no crosslinking agents are required for this purpose. If desired, physical curing may be assisted by atmospheric oxygen, by heat, or by exposure to actinic radiation.

The powder coating materials of the invention may be thermally curable. In this case they may be self-crosslinking or externally crosslinking.

In the context of the present invention the term "self-crosslinking" denotes the capacity of a binder to enter into crosslinking reactions with itself. A prerequisite for this is that the binders already contain both kinds of complementary reactive functional groups which are necessary for crosslinking. Externally crosslinking, on the other hand, is a term used to refer to those coating materials in which one kind of the complementary reactive functional groups is present in the binder and the other kind is present in a curing agent or crosslinking agent. For further details, refer to Römpp Lexikon Lacke und Druckfarben, Georg Thieme Verlag, Stuttgart, New York, 1998, "curing", pages 274 to 276, especially page 275 bottom).

The powder coating materials of the invention may be curable with actinic radiation.

In this case curing takes place by way of groups containing bonds which can be activated with actinic radiation. In the context of the present invention, actinic radiation means electromagnetic radiation, such as visible light, UV radiation or X-rays, especially UV radiation, and corpuscular radiation such as electron beams.

The powder coating materials of the invention may be curable thermally and with actinic radiation.

Where thermal curing and curing with actinic light are employed together for one powder coating material, the terms "dual cure" and "dual-cure powder coating material" are also used.

The powder coating materials of the invention are preferably one-component (1K) systems.

In the context of the present invention, one-component (1K) systems are powder coating materials which cure thermally or both thermally and with actinic radiation and in which the binder and the crosslinking agent are present alongside one another in the powder coating particles. A prerequisite for this is that the two constituents crosslink with one another only at relatively high temperatures and/or on exposure to actinic radiation.

The size of the dimensionally stable particles of the powder coating materials of the invention may vary widely. Preferably, it is between 5 and 500, more preferably between 5 and 400, with particular preference between 5 and 300, with very particular preference between 10 and 200, and in particular between 10 and 100 μm. The average particle size is preferably from 10 to 300, more preferably from 10 to 200, with particular preference from 10 to 150, with very particular preference from 10 to 100, and in particular from 10 to 50 μm. The particle size distribution may be narrow or broad. In the majority of cases a narrow particle size distribution is of advantage, as described in the patent applications and literature references EP 0 687 714 A1, DE 42 04 266 A1, DE 40 38 681 A1, P. G. de Lange and P. Selier, "Korngrößenverteilung und Eigenschaften von elektrostatischen Spritzpulvern (1)—Fraktionierung des Pulvers und Charakterisierung der Fraktionen" Farbe und Lack, vol. 79, No. 5, 1973, pages 403 to 412, P. G. de Lange and P. Selier, "Korngrößenvertailung und Eigenschaften von elektrostatischen Spritzpulvern (2)—Verhalten der Pulverfraktionen beim Spritzen und nach dem Einbrennen" Farbe und Lack, vol. 79, No. 6, 1973, pages 509 to 517, and EP 0 536 791 A1.

In the context of the present invention, "dimensionally stable" means that under the customary and known conditions of the storage and application of powder coating materials or powder coating suspensions the particles undergo little if any agglomeration and/or breakdown into smaller particles but instead substantially retain their original form even under the influence of shear forces. The particles may be highly viscous and/or solid. Preferably, the dimensionally stable particles are solid.

The powder coating materials of the invention are preferably free from volatile organic compounds (VOCs), especially from organic solvents (cosolvents). In the context of the present invention this means that they have a residual VOC content of <1% by weight, preferably <0.5% by weight, and with particular preference <0.2% by weight. In accordance with the invention it is of very particular advantage if the residual content is situated below the gas-chromatographic detection limit.

The process of the invention starts with the preparation of at least two liquid components comprising at least one liquid starting product of the powder coating materials of the invention. The starting products may already be liquid at room temperature or may melt only at higher temperatures. The critical factor is that the starting products are liquid at the process temperatures employed. Preferably, the starting products are solid at room temperature.

The two liquid components may further comprise at least one additive which is not liquid at the process temperatures employed. However, a nonliquid additive of this kind must be capable of homogeneous distribution in the liquid components and must not disrupt the mixing processes in the static mixer or in the dispersing unit.

Preferably, one of the liquid components comprises the melt of at least one of the binders described below. The binder melt may further comprise at least one of the additives described below. Preferably, these additives are liquid at the process temperatures employed and/or are present in homogeneous distribution in the melt.

Where the process of the invention is used to prepare powder coating materials of the invention which cure physically or are curable with actinic radiation, at least one of the further liquid components preferably comprises at least one of the additives described below which is liquid at the process temperatures employed.

Where the process of the invention is used to prepare powder coating materials of the invention which are curable thermally or both thermally and with actinic radiation, at least one of the further liquid components preferably comprises the melt of at least one of the crosslinking agents described below.

The preparation of the liquid components has no special features in terms of its method but instead takes place using the customary and known techniques and apparatus for preparing liquids, especially polymer melts, such as extruders, stirred tanks, Taylor reactors, tube reactors, loop reactors, etc. The starting products, especially the binders, may be prepared continuously in such apparatus and discharged continuously as a liquid.

The process temperatures are chosen so as not to exceed the decomposition temperature of the starting product which decomposes the most readily. Preference is given to employing process temperatures of from 50 to 250, preferably from 60 to 220, with particular preference from 70 to 200, with very particular preference from 80 to 190, and in particular from 90 to 180° C.

In the process of the invention the liquid components are first of all supplied in the desired proportion to a customary and known static mixer, and homogenized. Examples of suitable mixers are those of the Sulzer type, sold by Sulzer Chemtech GmbH.

The residence times of the liquid components in the static mixer are preferably from 0.5 to 20, more preferably from 1 to 18, with particular preference from 1.5 to 16, with very particular preference from 1.5 to 15, and in particular from 1.5 to 10 seconds.

The resulting liquid mixture comprises the liquid components in molecularly dispersed form and/or finely dispersed in one another.

The liquid mixture is subsequently supplied to the dispersing unit in which it is emulsified in an aqueous medium to give an aqueous emulsion of liquid particles which may comprise constituents that are not liquid at the process temperatures employed.

The aqueous medium preferably comprises essentially water or preferably consists thereof. In this case the aqueous medium may include minor amounts of the below-detailed additives and/or organic solvents and/or other dissolved solid, liquid or gaseous organic and/or inorganic substances of low and/or high molecular mass, provided they do not adversely affect the emulsification by, for example, causing the liquid particles to agglomerate. In the context of the present invention, the term "minor amount" means an amount which does not remove the aqueous character of the aqueous medium.

The aqueous medium comprising additives may also comprise the pigment pastes or pigment preparations described below. Preferably, the aqueous medium comprises the copolymers which are described below and are based on the monomers (a) and (b), described below, as emulsifiers.

Dispersing units which can be used are all customary and known dispersing units suitable for emulsifying liquids in aqueous media.

Examples of suitable dispersing units are inline dissolvers having a rotor/stator construction, preferably toothed-ring dispersing units particularly having at least one cylindrical arrangement of at least two comminutor rings (stator and rotor) which are seated on holders, are in mutual embrace, and are rotatable in opposite directions relative to one another, the working gap produced by the relative movement between stator and rotor having walls which extend nonparallelwise with respect to one another. In this case it is of advantage if the rotor rotates in the sense of an opening working gap. Examples of highly suitable toothed-ring dispersing units are described in detail in the patent EP 0 648 537 A1. They are sold under the trade name K-Generatoren by Kinematica AG, Lucerne, Switzerland.

The ratio of disperse phase to continuous phase may vary widely and is guided by the requirements of the specific case. Preferably, the volume ratio of liquid mixture to aqueous medium is chosen so as to give an emulsion and a suspension with a solids content of at least 40% by weight, more preferably at least 45% by weight, with particular preference at least 50% by weight, with very particular preference at least 55% by weight, and in particular at least 60% by weight.

The residence times of the liquid mixture and of the aqueous phase or the emulsion in the dispersing unit is preferably from 0.5 to 20, more preferably from 1 to 18, with particular preference from 1.5 to 16, with very particular preference from 1.5 to 15, and in particular from 1.5 to 10 seconds.

Following emulsification, the resultant emulsified liquid particles are cooled, thereby giving suspended, dimensionally stable, in particular solid, particles. Preferably, the emulsion is cooled immediately following its preparation without further aftertreatment. In this context it is preferred to employ the methods described in DE 196 52 813 A1, column 8 lines 9 to 17.

As a result of the cooling procedure, the liquid particles become dimensionally stable, and in particular become solid, thereby resulting in a suspension.

To prepare the powder coating materials of the invention, the suspended dimensionally stable particles are isolated. Viewed in terms of its method, the isolation has no special features but instead takes place with the aid of the customary and known equipment and techniques as are employed, for example, for filtration, spray drying or freeze drying. Highly suitable techniques are drying techniques, using rotary atomizers, pressure atomizers or pneumatic atomizers, such as are described in the International Patent Application WO 99/01499, page 5 line 24 to page 7 line 27 and page 27 line 16 to page 28 line 19.

Alternatively to the above-described variant of the isolation of the dimensionally stable particles from the suspensions, the dimensionally stable particles may also be recovered from the emulsions of the liquid particles. This is done preferably by pressure release (flashing), in the course of which the emulsions cool as a result of the Joule-Thomson effect and at the same time the continuous phase evaporates. For this purpose it is possible to employ customary and known equipment comprising pressure vessels and evacuated vessels.

When preparing powder coating materials of the invention which can be crosslinked with actinic radiation it is advantageous to work in the absence of actinic radiation.

The emulsified liquid particles and the suspended dimensionally stable particles comprise or consist of at least one binder.

The binder per se may be curable physically, thermally, with actinic radiation, and both thermally and with actinic radiation. In general it is present in the particles in an amount of from 5.0 to 100, preferably from 6.0 to 95, more preferably from 7.0 to 90, with particular preference from 8.0 to 85, with very particular preference from 9.0 to 80, and in particular from 10 to 80% by weight, based in each case on the total amount of the particles.

The binder preferably has a glass transition temperature above room temperature, more preferably from 30 to 80, with particular preference from 40 to 70, with very particular preference from 40 to 60, and in particular about 50° C. (measured by means of Differential Scanning Calorimetry (DSC)).

The molecular weight of the binder may vary very widely. In accordance with the invention it is preferred not to choose too high a binder molecular weight, since otherwise problems may occur in the course of its filming. Preferably, the number average molecular weight is from 500 to 30,000, more preferably from 500 to 25,000, with particular preference from 500 to 20,000, with very particular preference from 500 to 15,000, and in particular from 500 to 10,000.

The binders are oligomeric and polymeric resins. Oligomers are resins containing at least 2 to 15 monomer units in their molecule. In the context of the present invention, polymers are resins containing at least 10 repeating monomer units in their molecule. For further details of these terms, refer to Römpp Lexikon Lacke und Druckfarben, Georg Thieme Verlag, Stuttgart, New York, 1998, "oligomers", page 425.

It is of advantage if the minimum film formation temperature of the binders is in the region of their glass transition temperature Tg and in particular at at least 25° C. The minimum film formation temperature may be determined by drawing the aqueous dispersion of the binder down onto a glass plate using a coating bar and heating the drawdown in a gradient oven. The temperature at which the pulverulent layer forms a film is referred to as the minimum film formation temperature. For further details, refer to Römpp Lexikon Lacke und Druckfarben, Georg Thieme Verlag, Stuttgart, New York, 1998, "minimum film formation temperature", page 391.

Examples of suitable binders are random, alternating and/or block, linear and/or branched and/or comb addition (co)polymers of olefinically unsaturated monomers, or polyaddition resins and/or polycondensation resins. For further details of these terms, refer to Römpp Lexikon Lacke und Druckfarben, Georg Thieme Verlag, Stuttgart, New York, 1998, page 457, "polyaddition" and "polyaddition resins (polyadducts)", and pages 463 and 464, "polycondensates", "polycondensation" and "polycondensation resins", and also pages 73 and 74, "binders".

Examples of suitable addition (co)polymers are (meth)acrylate (co)polymers or partially saponified polyvinyl esters, especially (meth)acrylate copolymers.

Examples of suitable polyaddition resins and/or polycondensation resins are polyesters, alkyds, polyurethanes, polylactones, polycarbonates, polyethers, epoxy resin-amine adducts, polyureas, polyamides, polyimides, polyester-polyurethanes, polyether-polyurethanes or polyester-polyether-polyurethanes, especially polyester-polyurethanes.

Of these binders, the (meth)acrylate (co)polymers have particular advantages and are therefore used with particular preference.

The self-crosslinking binders of the thermally curable powder coating materials of the invention contain reactive functional groups which are able to enter into crosslinking reactions with groups of their own kind or with complementary reactive functional qroups.

The externally crosslinking binders contain reactive functional groups which are able to enter into crosslinking reactions with complementary reactive functional groups that are present in crosslinking agents.

Examples of suitable complementary reactive functional groups for use in accordance with the invention are summarized in the following overview. In the overview, the variable R stands for an acylic or cyclic aliphatic radical, an aromatic radical and/or an aromaticaliphatic (araliphatic) radical; the variables R' and R" stand for identical or different aliphatic radicals or are linked with one another to form an aliphatic or heteroaliphatic ring.

Overview: Examples of Complementary Functional Groups

| Binder and or Crosslinking agent | and or and | Crosslinking agent Binder |
|---|---|---|
| —SH | | —C(O)—OH |
| —NH$_2$ | | —C(O)—O—C(O)— |
| —OH | | —NCO |
| —O—(CO)—NH—(CO)—NH$_2$ | | —NH—C(O)—OR |
| —O—(CO)—NH$_2$ | | —CH$_2$—OH |
| >NH | | —CH$_2$—O—R |
| | | —NH—CH$_2$—O—R |
| | | —NH—CH$_2$OH |
| | | —N(—CH$_2$—O—R)$_2$ |
| | | —NH—C(O)—CH(—C(O)OR)$_2$ |
| | | —NH—C(O)—CH(—C(O)OR)(—C(O)—R) |
| | | —NH—C(0)—NR'R" |
| | | >Si(OR)$_2$ |
| | | —CH—CH$_2$ (epoxide) |
| | | —CH—CH$_2$ (cyclic carbonate) |
| —C(O)—OH | | —CH—CH$_2$ (epoxide) |
| | | —C(O)—N(CH$_2$—CH$_2$—OH)$_2$ |

The selection of the respective complementary groups is guided on the one hand by the consideration that, during the preparation, storage, application, and melting of the powder coating materials of the invention, they should not enter into any unwanted reactions, particularly no premature crosslinking, and/or, where appropriate, must not disrupt or inhibit curing with actinic radiation, and on the other by the temperature range within which crosslinking is to take place.

In the case of the powder coating materials of the invention it is preferred to employ crosslinking temperatures from 60 to 180° C. It is therefore preferred to employ binders containing thio, hydroxyl, N-methylolamino, N-alkoxymethylamino, imino, carbamate, allophanate and/or carboxyl groups, preferably hydroxyl or carboxyl groups, on the one hand and preferred to employ crosslinking agents containing anhydride, carboxyl, epoxy, blocked isocyanate, urethane, methylol, methylol ether, siloxane, carbonate, amino, hydroxyl and/or beta-hydroxyalkyl amide groups, preferably epoxy, beta-hydroxyalkylamide, blocked isocyanate, urethane or alkoxymethylamino groups, on the other.

In the case of self-crosslinking powder coating materials of the invention, the binders include in particular methylol, methylol ether and/or N-alkoxymethylamino groups.

Complementary reactive functional groups particularly suitable for use in the powder coating materials of the invention are
   carboxyl groups on the one hand and epoxide groups and/or beta-hydroxyalkylamide groups on the other, and
   hydroxyl groups on the one hand and blocked isocyanate, urethane or alkoxymethylamino groups on the other.

The functionality of the binders in respect of the reactive functional groups described above may vary very widely and depends in particular on the desired crosslinking density and/or on the functionality of the crosslinking agents employed in each case. In the case of carboxyl-containing binders, for example, the acid number is preferably from 10 to 100, more preferably from 15 to 80, with particular preference from 20 to 75, with very particular preference from 25 to 70, and, in particular, from 30 to 65 mg KOH/g. Alternatively, in the case of hydroxyl-containing binders, the OH number is preferably from 15 to 300, more preferably from 20 to 250, with particular preference from 25 to 200, with very particular preference from 30 to 150, and, in particular, from 35 to 120 mg KOH/g. Alternatively, in the case of binders containing epoxide groups, the epoxide equivalent weight is preferably from 400 to 2500, more preferably from 420 to 2200, with particular preference from 430 to 2100, with very particular preference from 440 to 2000, and, in particular, from 440 to 1900.

The complementary functional groups described above can be incorporated into the binders in accordance with the customary and known methods of polymer chemistry. This can be done, for example, by incorporating monomers which carry the corresponding reactive functional groups, and/or with the aid of polymer-analogous reactions.

Examples of suitable olefinically unsaturated monomers containing reactive functional groups are the monomers
  (a) described below, especially
  (i) monomers which carry at least one hydroxyl, amino, alkoxymethylamino, carbamate, allophanate or imino group per molecule, such as
     hydroxyalkyl esters of acrylic acid, methacrylic acid or another alpha,beta-olefinically unsaturated carboxylic acid, which are derived from an alkylene glycol which is esterified with the acid, or which are obtainable by reacting the alpha,beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; reaction products of cyclic esters, such as epsilon-caprolactone and these hydroxyalkyl or hydroxycycloalkyl esters;

olefinically unsaturated alcohols such as allyl alcohol;

polyols such as trimethylolpropane monoallyl or diallyl ether or pentaerythritol monoallyl, diallyl or triallyl ether;

reaction products of acrylic acid and/or methacrylic acid with the glycidyl ester of an alpha-branched monocarboxylic acid having 5 to 18 carbon atoms per molecule, especially a Versatic® acid, or instead of the reaction product an equivalent amount of acrylic and/or methacrylic acid, which is then reacted during or after the polymerization reaction with the glycidyl ester of an alpha-branched monocarboxylic acid having 5 to 18 carbon atoms per molecule, especially a Versatic® acid;

aminoethyl acrylate, aminoethyl methacrylate, allylamine or N-methyliminoethyl acrylate;

N,N-di(methoxymethyl)aminoethyl acrylate or methacrylate or N,N-di(butoxymethyl)aminopropyl acrylate or methacrylate;

(meth)acrylamides such as (meth)acrylamide, N-methyl-, N-methylol-, N,N-dimethylol-, N-methoxymethyl-, N,N-di(methoxymethyl)-, N-ethoxymethyl- and/or N,N-di(ethoxyethyl)-(meth)acrylamide;

acryloyloxy- or methacryloyloxyethyl, -propyl or -butyl carbamate or allophanate; further examples of suitable monomers containing carbamate groups are described in the patents U.S. Pat. No. 3,479,328, U.S. Pat. No. 3,674,838, U.S. Pat. No. 4,126,747, U.S. Pat. No. 4,279,833 and U.S. Pat. No. 4,340,497;

(ii) monomers (a3) which carry at least one acid group per molecule, such as acrylic acid, methacrylic acid, beta-carboxyethyl acrylate, ethacrylic acid, crotonic acid, maleic acid, fumaric acid or itaconic acid;

olefinically unsaturated sulfonic or phosphonic acids or their partial esters;

mono(meth)acryloyloxyethyl maleate, succinate or phthalate; or vinylbenzoic acid (all isomers), alphamethylvinylbenzoic acid (all isomers) or vinylbenzenesulfonic acid (all isomers);

(iii) monomers containing epoxide groups, such as the glycidyl ester of acrylic acid, methacrylic acid, ethacrylic acid, crotonic acid, maleic acid, fumaric acid or itaconic acid, or allyl glycidyl ether.

They are preferably used to prepare the inventively preferred (meth)acrylate copolymers, especially the ones containing glycidyl groups.

More highly functional monomers of the type described above are generally used in minor amounts. For the purposes of the present invention, minor amounts of higher-functional monomers are those amounts which do not lead to crosslinking or gelling of the addition copolymers, in particular of the (meth)acrylate copolymers, unless the specific desire is to prepare crosslinked polymeric microparticles.

Examples of suitable monomer units for introducing reactive functional groups into polyesters or polyester-polyurethanes are 2,2-dimethylolethyl- or -propylamine blocked with a ketone, the resulting ketoxime group being hydrolyzed again following incorporation; or compounds containing two hydroxyl groups or two primary and/or secondary amino groups and also at least one acid group, in particular at least one carboxyl group and/or at least one sulfonic acid group, such as dihydroxypropionic acid, dihydroxysuccinic acid, dihydroxybenzoic acid, 2,2-dimethylolacetic acid, 2,2-dimethylolpropionic acid, 2,2-dimethylolbutyric acid, 2,2-dimethylolpentanoic acid, 2,2-diaminovaleric acid, 3,4-diaminobenzoic acid, 2,4-diaminotoluenesulfonic acid or 2,4-diaminodiphenyl ether sulfonic acid.

One example of introducing reactive functional groups by way of polymer-analogous reactions is the reaction of hydroxyl-containing resins with phosgene, resulting in resins containing chloroformate groups, and the polymer-analogous reaction of the chloroformate-functional resins with ammonia and/or primary and/or secondary amines to give resins containing carbamate groups. Further examples of suitable methods of this kind are known from the patents U.S. Pat. No. 4,758,632 A1, U.S. Pat. No. 4,301,257 A1 and U.S. Pat. No. 2,979,514 A1. Moreover, it is possible to introduce carboxyl groups by polymer-analogous reaction of hydroxyl groups with carboxylic anhydrides, such as maleic anhydride or phthalic anhydride.

The binders of the dual-cure powder slurries and powder coating materials of the invention further comprise on average per molecule at least one, preferably at least two, group(s) having at least one bond that can be activated with actinic radiation.

For the purposes of the present invention, a bond that can be activated with actinic radiation is a bond which on exposure to actinic radiation becomes reactive and, with other activated bonds of its kind, enters into addition polymerization reactions and/or crosslinking reactions which proceed in accordance with free-radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity, they are referred to below as double bonds.

Accordingly, the group which is preferred in accordance with the invention comprises one double bond or two, three or four double bonds. If more than one double bond is used, the double bonds can be conjugated. In accordance with the invention, however, it is of advantage if the double bonds are present in isolation, in particular each being present terminally, in the group in question. It is of particular advantage in accordance with the invention to use two double bonds or, in particular, one double bond.

The dual-cure binder contains on average at least one of the above-described groups that can be activated with actinic radiation. This means that the functionality of the binder in this respect is integral, i.e., for example, is two, three, four, five or more, or nonintegral, i.e., for example, is from 2.1 to 10.5 or more. The functionality chosen depends on the requirements imposed on the respective pigmented dual-cure powder slurries and powder coating materials of the invention.

If more than one group that can be activated with actinic radiation is used on average per molecule, the groups are structurally different from one another or of the same structure.

If they are structurally different from one another, this means, in the context of the present invention, that use is made of two, three, four or more, but especially two, groups that can be activated by actinic radiation, these groups deriving from two, three, four or more, but especially two, monomer classes.

Examples of suitable groups are (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl, norbornenyl, isoprenyl, isopropenyl, allyl or butenyl ether groups; or dicyclopentadienyl, norbornenyl, isoprenyl, isopropenyl, allyl or butenyl ester groups, but especially acrylate groups.

Preferably, the groups are attached to the respective parent structures of the binders via urethane, urea, allophanate, ester, ether and/or amide groups, but in particular via ester groups. Normally, this occurs as a result of customary and known polymer-analogous reactions such as, for instance, the reaction of pendant glycidyl groups with the olefinically unsaturated monomers described above that contain an acid group, of pendant hydroxyl groups with the halides of these monomers, of hydroxyl groups with isocyanates containing double bonds such as vinyl isocyanate, methacryloyl isocyanate and/or 1-(1-isocyanato-1-methylethyl)-3-(1-methylethenyl)benzene (TMI® from the company CYTEC), or of isocyanate groups with the above-described hydroxyl-containing monomers.

Alternatively, in the particles it is possible to employ mixtures of purely thermally curable binders and binders that are curable purely with actinic radiation.

The material composition of the binders does not basically have any special features; rather, suitable binders include all the binders envisaged for use in powder clearcoat slurries curable thermally and/or with actinic radiation that are described in the U.S. patent U.S. Pat. No. 4,268,542 A1 or U.S. Pat. No. 5,379,947 A1 and in the patent applications DE 27 10 421 A1, DE 195 40 977 A1, DE 195 18 392 A1, DE 196 17 086 A1, DE 196 18 657 A1, DE 196 52 813 A1, DE 196 17 086 A1, DE 198 14 471 A1, DE 196 13 547 A1, DE 198 41 842 A1 or DE 198 41 408 A1, in the German patent applications DE 199 08 018.6 or DE 199 08 013.5, unpublished at the priority date of the present specification, or in the European patent EP 0 652 264 A1;

all the binders envisaged for use in dual-cure clearcoats that are described in the patent applications DE 198 35 296 A1, DE 197 36 083 A1 or DE 198 41 842 A1; or all the binders envisaged for use in thermally curable powder clearcoats and described in the German patent application DE 42 22 194 A1, in the product information bulletin from BASF Lacke+Farben A G, "Pulverlacke", 1990, or in the BASF Coatings AG brochure "Pulverlacke, Pulverlacke fur industrielle Anwendungen", January 2000.

Suitable additional binders for the dual-cure powder slurries and powder coating materials, are the binders envisaged for use in UV-curable clearcoats and powder clearcoats and described in European patent applications EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1 or EP 0 002 866 A1, in the German patent applications DE 197 09 467 A1, DE 42 03 278 A1, DE 33 16 593 A1, DE 38 36 370 A1, DE 24 36 186 A1 or DE 20 03 579 B1, in the international patent applications WO 97/46549 or WO 99/14254, or in the American patents U.S. Pat. No. 5,824,373 A1, U.S. Pat. No. 4,675,234 A1, U.S. Pat. No. 4,634,602 A1, U.S. Pat. No. 4,424,252 A1, U.S. Pat. No. 4,208,313 A1, U.S. Pat. No. 4,163,810 A1, U.S. Pat. No. 4,129,488 A1, U.S. Pat. No. 4,064,161 A1 or U.S. Pat. No. 3,974,303 A1.

The preparation of the binders also has no special features in terms of its method but instead takes place with the aid of the customary and known methods of polymer chemistry, as described in detail, for example, in the patent documents cited above.

Further examples of suitable preparation processes for (meth)acrylate copolymers are described in the European patent application EP 0 767 185 A1, in the German patents DE 22 14 650 B1 or DE 27 49 576 B1, and in the American patents U.S. Pat. No. 4,091,048 A1, U.S. Pat. No. 3,781,379 A1, U.S. Pat. No. 5,480,493 A1, U.S. Pat. No. 5,475,073 A1 or U.S. Pat. No. 5,534,598 A1, or in the standard work Houben-Weyl, Methoden der organischen Chemie, 4th edition, volume 14/1, pages 24 to 255, 1961. Suitable reactors for the copolymerization include the customary and known stirred tanks, stirred tank cascades, tube reactors, loop reactors or Taylor reactors, as described for example in the patents and patent applications DE 1 071 241 B1, EP 0 498 583 A1, and DE 198 28 742 A1 or in the article by K. Kataoka in Chemical Engineering Science, volume 50, No. 9, 1995, pages 1409 to 1416.

The preparation of suitable polyesters and alkyd resins are also described, for example, in the standard work Ullmanns Encyklopädie der technischen Chemie, 3rd edition, Volume 14, Urban & Schwarzenberg, Munich, Berlin, 1963, pages 80 to 89 and pages 99 to 105, and also in the following books: "Résines Alkydes-Polyesters" by J. Bourry, Dunod, Paris, 1952, "Alkyd Resins" by C. R. Martens, Reinhold Publishing Corporation, New York, 1961, and also "Alkyd Resin Technology" by T. C. Patton, Interscience Publishers, 1962.

The preparation of suitable polyurethanes and/or acrylated polyurethanes is described, for example, in the patent applications EP 0 708 788 A1, DE 44 01 544 A1, and DE 195 34 361 A1.

Of these binders, the (meth)acrylate copolymers containing epoxide groups, having an epoxide equivalent weight of preferably from 400 to 2500, more preferably from 420 to 2200, with particular preference from 430 to 2100, with very particular preference from 440 to 2000, and, in particular, from 440 to 1900, a number-average molecular weight (determined by gel permeation chromatography using a polystyrene standard) of preferably from 2000 to 20,000 and in particular from 3000 to 10,000, and a glass transition temperature ($T_g$) of preferably from 30 to 80, more preferably from 40 to 70 and in particular from 40 to 60° C. (measured by means of differential scanning calorimetry (DSC)), as suitable in particular for use in thermally curable powder clearcoat slurries (see above) and as described, furthermore, in the patents and patent applications EP 0 299 420 A1, DE 22 14 650 B1, DE 27 49 576 B1, U.S. Pat. No. 4,091,048 A1 and U.S. Pat. No. 3,781,379 A1, are particularly advantageous and are used with particular preference.

The externally crosslinking powder coating materials of the invention curable thermally or both thermally and with actinic radiation, and/or the particles used for their preparation, include at least one crosslinking agent containing the reactive functional groups complementary to the reactive functional groups of the binders. The skilled worker will therefore easily be able to select the crosslinking agents suitable for the case in hand.

In the process of the invention, the crosslinking agents are preferably supplied to the static mixer in the form of a separate liquid component, in particular a melt, or in a separate liquid component, in particular a melt. The ratio of binder melt to crosslinking agent melt is guided by the desired ratio of complementary reactive functional groups in the powder coating materials of the invention.

Examples of suitable crosslinking agents are amino resins, as described for example in Römpp Lexikon Lacke und Druckfarben, Georg Thieme Verlag, 1998, page 29, "amino resins", in the textbook "Lackadditive" [Additives for coatings] by Johan Bieleman, Wiley-VCH, Weinheim, N.Y., 1998, pages 242 ff., in the book "Paints, Coatings and Solvents", second, completely revised edition, edited by D. Stoye and W. Freitag, Wiley-VCH, Weinheim, N.Y., 1998, pages 80 ff., in the patents U.S. Pat. No. 4,710,542 A, and EP 0 245 700 A1, and in the article by B. Singh and coworkers, "Carbamylmethylated Melamines, Novel Crosslinkers for the Coatings Industry", in Advanced Organic Coatings Science and Technology Series, 1991, Volume 13, pages 193 to 207;

carboxyl-containing compounds or resins, as described for example in the patent DE 196 52 813 A1 or 198 41 408 A1, especially 1,12-dodecanedioic acid (1,10-decanedicarboxylic acid);

resins or compounds containing epoxy groups, as described for example in the patents EP 0 299 420 A1, DE 22 14 650 B1, DE 27 49 576 B1, U.S. Pat. No. 4,091,048 A1, and U.S. Pat. No. 3,781,379 A1;

blocked polyisocyanates, as described for example in the patents U.S. Pat. No. 4,444,954 A1, DE 196 17 086 A1, DE 196 31 269 A1, EP 0 004 571 A1, and EP 0 582 051 A1;

beta-hydroxyalkylamides such as N,N,N',N'-tetrakis(2-hydroxyethyl)adipamide or N,N,N',N'-tetrakis(2-hydroxypropyl)adipamide; and/or tris(alkoxycarbonylamino)triazines, as described in the patents U.S. Pat. No. 4,939,213 A1, U.S. Pat. No. 5,084,541 A1, U.S. Pat. No. 5,288,865 A1 and EP 0 604 922 A1.

The amount of the crosslinking agents in the particles may likewise vary very widely and is guided by the requirements of each individual case, in particular by the number of reactive functional groups present and by the target crosslinking density of the coatings, adhesive films, and seals produced from the powder coating materials of the invention. The amount is preferably from 1 to 50, more preferably from 2 to 45, with particular preference from 3 to 40, with very particular preference from 4 to 35, and in particular from 5 to 30% by weight, based on the solids of the powder coating materials of the invention.

Depending on the end use of the powder coating materials of the invention, they may comprise color and/or effect pigments, fluorescent pigments, electrically conductive and/or magnetically shielding pigments, metal powders, organic and inorganic, transparent or opaque fillers and/or nanoparticles (referred to collectively as "pigments" below). The pigments are used when the powder coating materials of the invention are to be used as pigmented coating materials, adhesives, and sealing compounds.

In the process of the invention they are preferably dispersed into the aqueous media in the form of pigment pastes or pigment preparations (cf. Römpp Lexikon Lacke und Druckfarben, Georg Thieme Verlag, Stuttgart, New York, 1998, "pigment preparations", page 452) or—as already mentioned above—they constitute the aqueous media. Preferably, they comprise the emulsifiers described below.

In one embodiment of the process of the invention, the emulsified or suspended particles comprise at least one pigment; i.e., the total amount of the pigments used is present in and/or on the particles.

In another embodiment of the process of the invention, the emulsified or suspended particles contain no pigment; i.e., all of the pigments are present in the form of a separate solid phase. Regarding their particle size, the comments made above apply analogously.

In yet another embodiment of the process of the invention, the emulsified or suspended particles comprise, in the sense mentioned above, a portion of the pigments used, while the other portion of the pigments is present in the form of a separate solid phase. In this case, the fraction present in the particles may comprise the majority, i.e., more than 50%, of the pigments used. It is, however, also possible for less than 50% to be present in and/or on the particles. Regarding the particle sizes, the comments made above apply analogously here as well.

Which variant of the process of the invention is given preference in preparing the pigmented powder coating materials of the invention depends in particular on the nature of the pigments and their functions. Particular preference is given to employing the variant in which all, or the predominant fraction, of the pigments are/is present in and/or on the emulsified and suspended particles.

Examples of suitable effect pigments are metal flake pigments such as commercially customary aluminum bronzes, aluminum bronzes chromated in accordance with DE 36 36 183 A1, and commercially customary stainless steel bronzes, and also nonmetallic effect pigments, such as pearlescent pigments and interference pigments, platelet-shaped effect pigments based on iron oxide, which has a shade ranging from pink to brownish red, liquid-crystalline effect pigments. For further details, reference is made to Römpp Lexikon Lacke und Druckfarben, Georg Thieme Verlag, 1998, page 176, "effect pigments" and pages 380 and 381, "metal oxide-mica pigments" to "metal pigments", and to the patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. No. 4,828,826 A, and U.S. Pat. No. 5,244,649 A.

Examples of suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, reference is made to Römpp Lexikon Lacke und Druckfarben, Georg Thieme Verlag, 1998, pages 180 and 181, "iron blue pigments" to "black iron oxide", pages 451 to 453, "pigments" to "pigment volume concentration", page 563, "thioindigo pigments", page 567, "titanium dioxide pigments", pages 400 and 467, "naturally occurring pigments", page 459 "polycyclic pigments", page 52, "azomethine pigments", "azo pigments", and page 379, "metal complex pigments".

Examples of (daylight-)fluorescent pigments are bis(azomethine) pigments.

Examples of suitable electrically conductive pigments are titanium dioxide/tin oxide pigments.

Examples of magnetically shielding pigments are pigments based on iron oxides or chromium dioxide.

Examples of suitable metal powders are powders of metals and metal alloys comprising aluminum, zinc, copper, bronze or brass.

Examples of suitable organic and inorganic fillers are chalk, calcium sulfates, barium sulfate, silicates such as talc, mica or kaolin, silicas, oxides such as aluminum hydroxide or magnesium hydroxide, or organic fillers such as polymer powders, especially of polyacrylonitrile or polyamide. For further details, reference is made to Römpp Lexikon Lacke und Druckfarben, Georg Thieme Verlag, 1998, pages 250 ff. "fillers".

Preference is given to employing mica and talc when the intention is to improve the scratch resistance of the coatings produced from the powder slurries of the invention.

Moreover, it is advantageous to use mixtures of platelet-shaped inorganic fillers such as talc or mica and non-platelet-shaped inorganic fillers such as chalk, dolomite, calcium sulfates or barium sulfate, since by this means the viscosity and rheology may be adjusted very effectively.

Examples of suitable transparent fillers are those based on silica, alumina or zirconium oxide.

Suitable nanoparticles are selected from the group consisting of hydrophilic and hydrophobic, especially hydrophilic, nanoparticles based on silica, alumina, zinc oxide, zirconium oxide, and the polyacids and heteropoly acids of transition metals, preferably of molybdenum and tungsten, having a primary particle size >50 nm, preferably from 5 to 50 nm, in particular from 10 to 30 nm. Preferably, the hydrophilic nanoparticles have no flatting effect. Particular preference is given to using nanoparticles based on silica.

Very particular preference is given to using hydrophilic pyrogenic silicas whose agglomerates and aggregates have a catenated structure, and which are preparable by the flame hydrolysis of silicon tetrachloride in an oxyhydrogen flame. They are sold, for example, by Degussa under the brand name Aerosil®. Very particular preference is also given to precipitated waterglasses, such as nanohectorites, which are sold, for example, by Südchemie under the brand name Optigel® or by Laporte under the brand name Laponite®.

Pigment pastes or pigment preparations may contain a particularly high level of nanoparticles when the emulsifiers described below and used with particular preference are employed, this being a further valuable advantage of the emulsifiers to be used with particular preference.

In addition to the above-described pigments or instead of these the powder coating materials of the invention may comprise molecularly dispersed organic dyes.

In the context of the process of the invention, the organic dyes may be supplied to the static mixer in the form of separate liquid components or in separate liquid components or in the binder and/or crosslinking agent melts and/or may be present in the above-described aqueous media.

The molecularly dispersed dyes may be present in the process of the invention either in the emulsified or suspended particles or in the continuous phase, i.e., the continuous, i.e., aqueous, medium. Alternatively, they may be present in the particles and in the continuous phase. In this case, the fraction that is present in the particles may comprise the majority, i.e., more than 50%, of the organic dyes used. However, less than 50% may be present, alternatively, in the particles. The distribution of the organic dyes between the phases may correspond to the thermodynamic equilibrium resulting from the solubility of the organic dyes in the phases. However, the distribution may also be far removed from the thermodynamic equilibrium. The dyes are preferably present only in the emulsified and suspended particles.

Suitable organic dyes are all those soluble in the sense outlined above in the powder coating materials of the invention. Lightfast organic dyes are highly suitable. Lightfast organic dyes having little or no tendency to migrate from the coatings, adhesive films, and seals produced from the powder coating materials of the invention are especially suitable. The migration tendency may be estimated by the skilled worker on the basis of his or her general knowledge of the art and/or determined with the aid of simple preliminary rangefinding tests, as part of tinting tests, for example.

The amount of the molecularly dispersed organic dyes in the powder coating materials of the invention may vary extremely widely and is guided primarily by the color and by the shade that is to be established, and also by the amount of any pigments present.

The pigmented and unpigmented powder coating materials of the invention may comprise at least one further additive. In the context of the process of the invention, said additive may be supplied to the static mixer as a separate liquid component or in a separate liquid component. Preferably, the additive is incorporated into the emulsified and suspended particles by way of the binder melts.

Examples of suitable additives which may be present both in the pigmented and nonpigmented powder coating materials of the invention are UV absorbers, antioxidants, light stabilizers, free-radical scavengers, devolatilizers, wetting agents, slip additives, polymerization inhibitors, crosslinking catalysts, thermolabile free-radical initiators, photoinitiators, thermally curable reactive diluents, reactive diluents curable with actinic radiation, adhesion promoters, leveling agents, film-forming auxiliaries, flame retardants, corrosion inhibitors, free-flow aids, waxes, siccatives, biocides and/or flatting agents.

Examples of suitable thermally curable reactive diluents are positionally isomeric diethyloctanediols or hydroxyl-containing hyperbranched compounds or dendrimers, as described in the German patent applications DE 198 09 643 A1, DE 198 40 605 A1 and DE 198 05 421 A1.

Examples of suitable reactive diluents curable with actinic radiation are those described in Römpp Lexikon Lacke und Druckfarben, Georg Thieme Verlag, Stuttgart, New York, 1998, on page 491 under the entry on "reactive diluents".

Examples of suitable light stabilizers are HALS compounds, benzotriazoles or oxalanilides.

Examples of suitable antioxidants are hydrazines and phosphorus compounds.

Examples of suitable polymerization inhibitors are organic phosphites or 2,6-di-tert-butylphenol derivatives.

Examples of suitable thermolabile free-radical initiators are dialkyl peroxides, hydroperoxides peresters, azo dinitriles or C-C-cleaving initiators.

Examples of suitable photoinitiators are described in Römpp Chemie Lexikon, 9th, expanded and revised edition, Georg Thieme Verlag, Stuttgart, Vol. 4, 1991, or in Römpp Lexikon Lacke und Druckfarben, Georg Thieme Verlag, Stuttgart, 1998, pages 444 to 446.

Examples of suitable crosslinking catalysts are bismuth lactate, citrate, ethylhexanoate or dimethylolpropionate, dibutyltin dilaurate, lithium decanoate or zinc octoate, amine-blocked organic sulfonic acids, quaternary ammonium compounds, amines, imidazole and imidazole derivatives such as 2-styrylimidazole, 1-benzyl-2-methylimidazole, 2-methylimidazole and 2-butylimidazole, as described in the Belgian patent no. 756,693, or phosphonium catalysts such as ethyltriphenylphosphonium iodide, ethyltriphenylphosphonium chloride, ethyltriphenylphosphonium thiocyanate, ethyltriphenylphosphonium acetate-acetic acid complex, tetrabutylphosphonium iodide, tetrabutylphosphonium bromide and tetrabutylphosphonium acetateacetic acid complex, as described, for example, in the U.S. patents U.S. Pat. No. 3,477,990 A or U.S. Pat. No. 3,341,580 A.

Examples of suitable devolatilizers are diazadicycloundecane or benzoin.

Examples of suitable wetting agents are siloxanes, fluorine compounds, carboxylic monoesters, phosphates, polyacrylic acids and their copolymers, or polyurethanes.

An example of a suitable adhesion promoter is tricyclodecanedimethanol.

Examples of suitable film-forming auxiliaries are cellulose derivatives.

An example of a suitable flatting agent is magnesium stearate.

Further examples of the additives listed above and also of suitable leveling agents, flame retardants, siccatives, dryers, antiskinning agents, corrosion inhibitors, biocides, and waxes are described in detail in the textbook "Lackadditive" [Additives for coatings] by Johan Bieleman, Wiley-VCH, Weinheim, N.Y., 1998.

Further suitable additives include low-boiling and high-boiling ("long") organic solvents, as are commonly used in the field of coating materials. In view of the fact that the powder slurries and powder coating materials of the invention are preferably free of VOCs, the organic solvents are used only in exceptional cases.

In the process of the invention it is preferred to use emulsifiers as well. Suitable emulsifiers of this kind are the customary and known emulsifiers, such as are described, for example, in the patent applications cited at the outset. Further examples of emulsifiers are nonionic emulsifiers, such as alkoxylated alkanols and polyols, phenols and alkylphenols or anionic emulsifiers such as alkali metal salts or ammonium salts of alkanecarboxylic acids, alkanesulfonic acids, and sulfo acids of alkoxylated alkanols and polyols, phenols and alkylphenols.

For the preparation of the powder coating materials of the invention it is preferred to use an emulsifier whose aqueous solution at the critical micelle concentration (CMC) has a surface tension >30, preferably >35, and in particular >40 mN/m.

In the context of the present invention, the critical micelle concentration (CMC) is the characteristic concentration at which above a certain temperature (the Krafft point) micelles form from surfactant molecules in aqueous solutions (cf. Römpp-Chemie-Lexikon, Georg Thieme Verlag, Stuttgart, New York, 9th edition, 1991, volume 4, pages 2769 and 2770, "micelles").

Accordingly, emulsifiers suitable for preparing the powder coating materials of the invention are all ionic and nonionic emulsifiers which meet this condition.

Particularly preferred emulsifiers used are copolymers preparable by single-stage or multistage, especially single-stage, free-radical, especially controlled free-radical, copolymerization of (a) at least one olefinically unsaturated monomer and
(b) at least one olefinically unsaturated monomer different than the olefinically unsaturated monomer (a) and of the general formula I $$R^1R^2C\!=\!CR^3R^4 \qquad (I),$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;

in an aqueous medium.

Examples of suitable monomers (a) are (a1) substantially acid-group-free (meth)acrylic esters such as (meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol acrylate or tertbutylcyclohexyl (meth)acrylate; (meth)acrylic oxa-alkyl esters or oxacycloalkyl esters such as ethyltriglycol (meth)acrylate and methoxyoligoglycol (meth)acrylate having a molecular weight Mn of preferably 550, or other ethoxylated and/or propoxylated hydroxyl-free (meth)acrylic acid derivatives. These may contain minor amounts of (meth)acrylic alkyl or cycloalkyl esters of higher functionality, such as the di(meth)acrylates of ethylene glycol, propylene glycol, diethylene glycol, dipropylene glycol, butylene glycol, 1,5-pentanediol, 1,6-hexanediol, octahydro-4,7-methano-1H-indenedimethanol or 1,2-, 1,3- or 1,4-cyclohexanediol; trimethylolpropane di- or tri(meth)acrylate; or pentaerythritol di-, tri- or tetra(meth)acrylate. For the purposes of the present invention, minor amounts of monomers of higher functionality in this case are to be understood as amounts which do not lead to crosslinking or gelling of the copolymers.

(a2) Monomers which carry per molecule at least one hydroxyl group, amino group, alkoxymethylamino group or imino group and are substantially free from acid groups, such as hydroxyalkyl esters of acrylic acid, methacrylic acid or another alpha,beta-olefinically unsaturated carboxylic acid, which derive from an alkylene glycol esterified with the acid, or which are obtainable by reacting the alpha,beta-olefinically unsaturated carboxylic acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis (hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; or reaction products of cyclic esters, such as epsilon-caprolactone, for example, and these hydroxyalkyl or hydroxycycloalkyl esters; or olefinically unsaturated alcohols such as allyl alcohol or polyols such as trimethylolpropane monoallyl or diallyl ether or pentaerythritol monoallyl, diallyl or triallyl ether (as far as these monomers (a2) of higher functionality are concerned, the comments made above relating to the monomers (a1) of higher functionality apply analogously); N,N-dimethylaminoethyl acrylate, N,N-diethylaminoethyl methacrylate, allylamine or N-methyliminoethyl acrylate or N,N-di(methoxymethyl)aminoethyl acrylate and methacrylate or N,N-di(butoxymethyl)aminopropyl acrylate and methacrylate.

(a3) Monomers which carry per molecule at least one acid group which can be converted to the corresponding acid anion group, such as acrylic acid, methacrylic acid, beta-carboxyethyl acrylate, ethacrylic acid, crotonic acid, maleic acid, fumaric acid or itaconic acid; olefinically unsaturated sulfonic or phosphonic acids or their partial esters; or mono(meth)acryloyloxyethyl maleate, succinate or phthalate.

(a4) Vinyl esters of alpha-branched monocarboxylic acids having 5 to 18 carbon atoms in the molecule. The branched monocarboxylic acids can be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or, respectively, with carbon monoxide and water produces a mixture of carboxylic acids in which the carboxyl groups are located predominantly on a quaternary carbon atom. Examples of other olefinic starting materials are propylene trimer, propylene tetramer and diisobutylene. Alternatively, the vinyl esters (a4) may be prepared in a conventional manner from the acids, by reacting, for example, the acid with acetylene. Particular preference, owing to their ready availability, is given to using vinyl esters of saturated aliphatic monocarboxylic acids having 9 to 11 carbon atoms that are branched on the alpha carbon atom, but especially Versatic® acids.

(a5) Reaction products of acrylic acid and/or methacrylic acid with the glycidyl ester of an alpha-branched monocarboxylic acid having 5 to 18 carbon atoms per molecule, especially a Versatic® acid, or, instead of the reaction product, an equivalent amount of acrylic acid and/or methacrylic acid which is then reacted during or after the polymerization reaction with the glycidyl ester of an alpha-branched monocarboxylic acid having 5 to 18 carbon atoms per molecule, especially a Versatic® acid.

(a6) Cyclic and/or acyclic olefins such as ethylene, propylene, 1-butene, 1-pentene, 1-hexene, cyclohexene, cyclopentene, norbornene, butadiene, isoprene, cyclopentadiene and/or dicyclopentadiene.

(a7) (Meth)acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl-, N,N-cyclohexylmethyl- and/or N-methylol-, N,N-dimethylol-, N-methoxymethyl-, N,N-di(methoxymethyl)-, N-ethoxymethyl- and/or N,N-di(ethoxymethyl)-(meth) acrylamide. Monomers of the last-mentioned kind are used in particular to prepare self-crosslinking binders (A).

(a8) Monomers containing epoxide groups, such as the glycidyl ester of acrylic acid, methacrylic acid, ethacrylic acid, crotonic acid, maleic acid, fumaric acid and/or itaconic acid.

(a9) Vinylaromatic hydrocarbons such as styrene, alpha-alkylstyrenes, especially alpha-methylstyrene, and/or vinyltoluene; vinylbenzoic acid (all isomers), N,N-diethylaminostyrene (all isomers), alpha-methylvinylbenzoic acid (all isomers), N,N-diethylamino-alpha-methylstyrene (all isomers) and/or p-vinylbenzenesulfonic acid.

(a10) Nitriles such as acrylonitrile and/or methacrylonitrile.

(a11) Vinyl compounds, especially vinyl halides and/or vinylidene dihalides such as vinyl chloride, vinyl fluoride, vinylidene dichloride or vinylidene difluoride; N-vinylamides such as vinyl-N-methylformamide, N-vinylcaprolactam, 1-vinylimidazole or N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethylheptanoic acid.

(a12) Allyl compounds, especially allyl ethers and allyl esters such as allyl methyl, ethyl, propyl or butyl ether or allyl acetate, propionate or butyrate.

(a13) Polysiloxane macromonomers having a numberaverage molecular weight Mn of from 1000 to 40,000 and having on average from 0.5 to 2.5 olefinically unsaturated double bonds per molecule; especially polysiloxane macromonomers having a number-average molecular weight Mn of from 2000 to 20,000, with particular preference from 2500 to 10,000 and, in particular, from 3000 to 7000 and having on average from 0.5 to 2.5, preferably from 0.5 to 1.5, olefinically unsaturated double bonds per molecule, as are described in DE-A-38 07 571 on pages 5 to 7, in DE-A-37 06 095 in columns 3 to 7, in EP-B-0 358 153 on pages 3 to 6, in U.S. Pat. No. 4,754,014 in columns 5 to 9, in DE-A-44 21 823 or in the international patent application WO 92/22615 on page 12 line 18 to page 18 line 10.

(a14) Acryloxysilane-containing vinyl monomers, preparable by reacting hydroxy-functional silanes with epichlorohydrin and then reacting the reaction product with (meth)acrylic acid and/or with hydroxyalkyl and/or hydroxycycloalkyl esters of (meth)acrylic acid (cf. monomers a2).

Each of the abovementioned monomers (a1) to (a14) may be polymerized on their own with the monomers (b). In accordance with the invention, however, it is advantageous to use at least two monomers (a), in particular at least one monomer (a1) and at least one monomer (a3), since by this means it is possible to vary the profile of properties of the resulting copolymers very widely, in a particularly advantageous manner, and to tailor said profile of properties to the particular process of the invention. In particular, it is possible in this way to incorporate into the copolymers functional groups by means of which the copolymers may be incorporated by crosslinking into the coatings, adhesive films, and seals produced from the powder slurries and powder coating materials of the invention.

Monomers (b) used comprise compounds of the general formula I.

In the general formula I, the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals.

Examples of suitable alkyl radicals are methyl, ethyl, propyl, isopropyl, n-butyl, isobutyl, tert-butyl, amyl, hexyl or 2-ethylhexyl.

Examples of suitable cycloalkyl radicals are cyclobutyl, cyclopentyl or cyclohexyl.

Examples of suitable alkylcycloalkyl radicals are methylenecyclohexane, ethylenecyclohexane or propane-1,3-diylcyclohexane.

Examples of suitable cycloalkylalkyl radicals are 2-, 3- or 4-methyl-, -ethyl-, -propyl- or -butylcyclohex-1-yl.

Examples of suitable aryl radicals are phenyl, naphthyl or biphenylyl.

Examples of suitable alkylaryl radicals are benzyl or ethylene- or propane-1,3-diylbenzene.

Examples of suitable cycloalkylaryl radicals are 2-, 3- or 4-phenylcyclohex-1-yl.

Examples of suitable arylalkyl radicals are 2-, 3- or 4-methyl-, -ethyl-, -propyl- or -butylphen-1-yl.

Examples of suitable arylcycloalkyl radicals are 2-, 3- or 4-cyclohexylphen-1-yl.

The above-described radicals $R^1$, $R^2$, $R^3$ and $R^4$ may be substituted. The substituents used may comprise electron-withdrawing or electron-donating atoms or organic radicals.

Examples of suitable substituents are halogen atoms, especially chlorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl, arylalkyl and arylcycloalkyl radicals, including those exemplified above, especially tertbutyl; aryloxy, alkyloxy and cycloalkyloxy radicals, especially phenoxy, naphthoxy, methoxy, ethoxy, propoxy, butyloxy or cyclohexyloxy; arylthio, alkylthio and cycloalkylthio radicals, especially phenylthio, naphthylthio, methylthio, ethylthio, propylthio, butylthio or cyclohexylthio; hydroxyl groups; and/or primary, secondary and/or tertiary amino groups, especially amino, N-methylamino, N-ethylamino, N-propylamino, N-phenylamino, N-cyclohexylamino, N,N-dimethylamino, N,N-diethylamino, N,N-dipropylamino, N,N-diphenylamino, N,N,-dicyclohexylamino, N-cyclohexyl-N-methylamino and N-ethyl-N-methylamino.

Examples of monomers (b) whose use is particularly preferred in accordance with the invention are diphenylethylene, dinaphthaleneethylene, cis- or trans-stilbene, vinylidenebis(4-N,N-dimethylamino-benzene), vinylidenebis(4-aminobenzene), and vinylidenebis(4-nitrobenzene).

In accordance with the invention, the monomers (b) may be used individually or as a mixture of at least two monomers (b).

In terms of the reaction regime and the properties of the resultant copolymers, especially the acrylate copolymers, diphenylethylene is of very particular advantage and is therefore used with very particular preference in accordance with the invention.

The monomers (a) and (b) to be used in accordance with the invention are reacted with one another in the presence of at least one free-radical initiator to form the copolymer. Examples of initiators which can be used are: dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butylper-2-ethylhexanoate; potassium, sodium or ammonium peroxodisulfate; azodinitriles such as azobisisobutyronitrile; C—C-cleaving initiators such as benzpinacol silyl ethers; or a combination of a nonoxidizing initiator with hydrogen peroxide.

It is preferred to add comparatively large amounts of free-radical initiator, the proportion of the initiator in the reaction mixture being, based in each case on the overall amount of the monomers (a) and of the initiator, with particular preference from 0.5 to 50% by weight, with very particular preference from 1 to 20% by weight, and in particular from 2 to 15% by weight.

Preferably, the weight ratio of initiator to the monomers (b) is from 4:1 to 1:4, with particular preference from 3:1 to 1:3, and in particular from 2:1 to 1:2. Further advantages result if the initiator is used in excess within the stated limits.

The free-radical copolymerization is preferably conducted in the apparatus mentioned above, especially stirred tanks or Taylor reactors, the Taylor reactors being designed such that the conditions of Taylor flow are met over the entire reactor length, even if the kinematic viscosity of the reaction medium alters greatly, and in particular increases, owing to the copolymerization.

The copolymerization is conducted in an aqueous medium.

The aqueous medium substantially comprises, or consists of, water. The aqueous medium may include minor amounts of the additives and/or organic solvents and/or other dissolved solid, liquid or gaseous organic and/or inorganic substances of low and/or high molecular mass, described above in detail, provided these do not adversely affect, or even inhibit, the copolymerization. In the context of the present invention, the term "minor amount" means an amount which does not remove the aqueous character of the aqueous medium.

The copolymerization is preferably conducted in the presence of at least one base. Particular preference is given to low molecular mass bases such as sodium hydroxide solution, potassium hydroxide solution, ammonia, diethanolamine, triethanolamine, mono-, di- and triethylamine, and/or dimethylethanolamine, especially ammonia and/or di- and/or triethanolamine.

The copolymerization is advantageously conducted at temperatures above room temperature and below the lowest decomposition temperature of the monomers used in each case, preference being given to a chosen temperature range of from 10 to 150° C., with very particular preference from 70 to 120° C., and in particular from 80 to 110° C.

When using particularly volatile monomers (a) and/or (b), the copolymerization may also be conducted under pressure, preferably under from 1.5 to 3000 bar, with particular preference from 5 to 1500 bar, and in particular from 10 to 1000 bar.

In terms of the molecular weight distributions, there are no restrictions whatsoever imposed on the copolymer. Advantageously, however, the copolymerization is conducted so as to give a molecular weight distribution Mw/Mn, measured by gel permeation chromatography using polystyrene as standard, of $\leq 4$, with particular preference $\leq 2$, and in particular $\leq 1.5$, and in certain cases even $\leq 1.3$. The molecular weights of the constituents (A) may be controlled within wide limits by the choice of ratio of monomer (a) to monomer (b) to free-radical initiator. In this context, the amount of monomer (b) in particular determines the molecular weight, specifically such that the higher the proportion of monomer (b), the lower the resultant molecular weight.

The copolymer resulting from the copolymerization is obtained as a mixture with the aqueous medium, generally in the form of a dispersion. In this form it can be used as an emulsifier directly or else isolated as a solid and then passed on for use in accordance with the invention.

The emulsifier may be introduced, in particular in the form of a solid, into the melts and/or, in particular in the form of a dispersion, into the aqueous media. Preferably it is introduced in the form of a dispersion into the aqueous media.

In one particular preferred embodiment of the process of the invention, employed first and foremost when preparing pigmented powder coating materials of the invention, the particularly preferred emulsifier is introduced into the aqueous media via at least one of the above-described pigment pastes or pigment preparations. Or else the pigment pastes or pigment preparations in question constitute the aqueous medium.

The amount of the emulsifiers that is used in the process of the invention may vary greatly and is guided by the requirements of each individual case. For instance, they may be used in the customary amounts known from the prior art for emulsifiers. They are preferably used in an amount of from 0.01 to 5.0, more preferably from 0.02 to 4.5, with particular preference from 0.03 to 4, with very particular preference from 0.04 to 3.5, and in particular from 0.05 to 3% by weight, based in each case on the amount of the melted or solid particles and the emulsifiers.

The powder coating materials of the invention possess outstanding fluidity, storage properties, and transport properties, and exhibit no caking even on prolonged storage. Their application characteristics are outstanding. They are outstandingly suitable as, or for preparing, coating materials, adhesives, and sealing compounds.

The coating materials of the invention are outstandingly suitable for producing single-coat or multicoat, color and/or effect, electrically conductive, magnetically shielding or fluorescent coatings, such as primer-surfacer coats, basecoats, solid-color topcoats or combination effect coats, or single-coat or multicoat clearcoat systems.

The adhesives of the invention are outstandingly suitable for producing adhesive films, and the sealing compounds of the invention are outstandingly suitable for producing seals.

Very particular advantages result when the unpigmented powder coating materials of the invention are used as clearcoat materials for producing single-coat or multicoat clearcoat systems. In particular, the clearcoat materials of the invention are used to produce multicoat color and/or effect coating systems by the wet-on-wet technique, in which a basecoat material, especially an aqueous basecoat material, is applied to the surface of a substrate, and then the resultant basecoat film, without being cured, is dried and is overcoated with a clearcoat film. Thereafter the two films are cured together.

Very particularly advantages result when the pigmented powder coating materials of the invention are used to produce single-coat or multicoat color and/or effect coating systems or combination effect coats. A combination effect coat is a coating which performs at least two functions in a color and/or effect system. Functions of this kind include in particular protection against corrosion, adhesion promotion, the absorption of mechanical energy, and the imparting of color and/or effect. Preferably, the combination effect coat serves to absorb mechanical energy and to impart color and/or effect at the same time; it therefore fulfills the functions of a primer-surfacer coat or antistonechip primer and of a basecoat. Preferably, the combination effect coat additionally has a corrosion protection effect and/or adhesion promotion effect.

The pigmented coatings or coating systems may likewise be produced using wet-on-wet techniques. For example, the pigmented powder coating materials of the invention may be applied to electrocoat films which have not been cured, or not been cured fully, and then the films one above the other are cured together.

The very particular advantage of the powder coating materials of the invention is that they can be used to produce all kinds of multicoat paint systems based completely or predominantly on the powder coating materials of the invention.

The application of the powder coating materials also has no special features in terms of its method but instead takes place, for example, in accordance with the customary and known fluidized-bed techniques, such as are known, for example, from the BASF Coatings AG brochures "Pulverlacke, für industrielle Anwendungen" [Powder coating materials for industrial applications], January 2000, or "Coatings Partner, Pulverlack Spezial" [Powder coatings special], ½000, or Römpp Lexikon Lacke und Druckfarben, Georg Thieme Verlag, Stuttgart, New York, 1998, pages 187 and 188, "electrostatic powder spraying", "electrostatic spraying" and "electrostatic fluidized bath process".

Suitable substrates are all those whose surface is not damaged by the application of heat and/or actinic radiation in the course of the curing of the films present thereon. Preferably, the substrates comprise metals, plastics, wood, ceramic, stone, textile, fiber composites, leather, glass, glass fibers, glass wool and rockwool, mineral- and resin-bound building materials, such as plasterboard and cement slabs or roof tiles, and also composites of these materials.

Accordingly, the coating materials, adhesives, and sealing compounds are outstandingly suitable for coating, bonding, and sealing motor vehicle bodies, parts of motor vehicle bodies, the interior and exterior of motor vehicles, the inside and outside of buildings, doors, windows, furniture, and for coating, bonding and sealing in the context of the industrial coating, for example, of small parts, such as nuts, bolts, wheel rims or hubcaps, coils, containers, packaging, electrical components, such as motor windings or transformer windings, and of white goods, such as domestic appliances, boilers, and radiators.

In the case of electrically conductive substrates it is possible to use primers produced conventionally from the electrodeposition coating materials. Both anodic and cathodic electrocoat materials are suitable for this purpose, but especially cathodic electrocoat materials. Unfunctionalized and/or nonpolar plastics surfaces may be subjected prior to coating in a known manner to a pretreatment, such as with a plasma or by flaming, or may be provided with a water-based primer.

The curing of the applied powder coating materials of the invention also has no special features in terms of its method but it then takes place in accordance with the customary and known thermal methods, such as heating in a forced air oven or irradiation using IR lamps. For actinic radiation curing, suitable radiation sources include those such as high- or low-pressure mercury vapor lamps, which may be doped with lead in order to open up a radiation window up to 405 nm, or electron beam sources. Examples of suitable techniques and apparatus for curing with actinic radiation are described in the German patent application DE 198 18 735 A1, column 10 lines 31 to 61.

The resultant coatings of the invention, especially the single-coat or multicoat color and effect coating systems, combination effect coats and clearcoat systems of the invention are easy to produce and have outstanding optical properties and very high light, chemical, water, condensation, and weathering resistance. In particular they are free from turbidities and inhomogeneities. They are hard, flexible, and scratch resistant. They have very good reflow properties and outstanding intercoat adhesion, and exhibit good to very good adhesion to customary and known automotive refinishes.

The adhesive films of the invention bond a very wide variety of substrates to one another firmly and durably and possess high chemical and mechanical stability even in the case of extreme temperatures and/or temperature fluctuations.

Similarly, the seals of the invention seal the substrates durably and possess high chemical and mechanical stability even in the case of extreme temperatures and/or temperature fluctuations and even in conjunction with exposure to aggressive chemicals.

A further advantage of the dual-cure coating materials, adhesives, and sealing compounds is that, even in the shadow zones of three-dimensional substrates of complex shape, such as vehicle bodies, radiators or electrical wound goods, and even without optimum—especially complete—elimination of the shadow zones with actinic radiation, they produce coatings, adhesive films, and seals whose profile of performance properties is at least equal to that of the coatings, adhesive films, and seals outside the shadow zones. As a result, the coatings, adhesive films and seals in the shadow zones are also no longer readily damaged by mechanical and/or chemical attack, as may occur, for example, when further components of motor vehicles are installed in the coated bodies.

Accordingly, the primed or unprimed substrates which are commonly employed in the technological fields set out above and which are coated with at least one coating of the invention, bonded with at least one adhesive film of the invention and/or sealed with at least one seal of the invention combine a particularly advantageous profile of performance properties with a particularly long service life, so making them particularly attractive economically.

EXAMPLES

Preparation Example 1

The Preparation of an Emulsifier

A suitable reaction vessel fitted with three feed vessels, stirrer, reflux condenser, and oil heating, was charged with 52.56 parts by weight of deionized water and this initial charge was heated to 900 Celsius. Thereafter, at this temperature, three separate feed streams were metered in to the initial charge in parallel and at a uniform rate. The first feed stream consisted of 10.18 parts by weight of acrylic acid, 18.35 parts by weight of methyl methacrylate, and 1.49 parts by weight of diphenyl ethylene. The second feed stream consisted of 9.9 parts by weight of a 25% strength by weight ammonia solution in water. The third feed stream consisted of a solution of 2.25 parts by weight of ammonium peroxodisulfate in 5.25 parts by weight of deionized water. The first and second feed streams were metered in over the course of one hour. The third feed stream was metered in over the course of 1.25 hours. After the end of the addition, polymerization was continued for four hours. During this time the temperature of the reaction mixture was slowly reduced. The result was a dispersion of the emulsifier having a solids content of 33% by weight. The aqueous solution of the emulsifier had a surface tension of 50 mN/m at the critical micelle concentration.

Preparation Example 2

The Preparation of a Binder

The binder was prepared by solution polymerization of 25 parts by weight of styrene, 36 parts by weight of methyl methacrylate, 28 parts by weight of glycidyl methacrylate and 11 parts by weight of butyl methacrylate in xylene at 140° Celsius. As initiator, 6.7 parts by weight of tert-butyl perethylhexanoate were used. Following polymerization, the solvent was stripped. The resulting solid resin had a number-average molecular weight of 4 200 Daltons and an epoxide equivalent weight of 550 g/mol. It was heated to process temperature in a melt vessel.

Example 1

The Preparation of a Powder Coating Material of the Invention

Three heatable melt containers were connected via metering pumps to a static Sulzer mixer (empty volume: 0.0463 liter). The exit of the mixer was connected to a toothed-ring dispersing unit (K-Generator from Kinematica AG, Lucerne, Switzerland) into which a continuous aqueous phase was metered in parallel to the disperse phase (the mixture of the three melts).

The first melt container contained a mixture of 95.1% by weight of the melted resin of Preparation Example 2, 2.5% by weight of Tinuvin® CGL 1545 (commercial UV absorber from Ciba Specialty Chemicals), 1.3% by weight of Tinuvin® 123 (commercial reversible free-radical scavenger, HALS, from Ciba Specialty Chemicals), 0.3% by weight of Irgafos® P-EPQ (commercial antioxidant from Ciba Specialty Chemicals), 0.8% by weight Troy® EX 542 (commercial benzoin-containing devolatilizer from Troy, USA).

The melt was pumped into the mixer at a process temperature of 152° C. and a mass flow rate of 34 kg/h. Its disperse phase fraction was 73.6% by weight.

The second melt container contained dodecanedioic acid, which at a process temperature of 154° C. was pumped into the mixer at a mass flow rate of 7.2 kg/h. Its disperse phase fraction was 16.2% by weight.

The third melt container contained a 3,5-dimethylpyrazole-blocked polyisocyanate based on isophorone diisocyanate, having an NCO content of 15.5% by weight, which at a process temperature of 134° C. was pumped into the mixer at a mass flow rate of 5.0 kg/h. Its disperse phase fraction was 10.8% by weight.

After a residence time of 3.5 s, the melt entered the chamber of the toothed-ring dispersing unit.

From a further feed vessel the continuous aqueous phase comprising 95% by weight deionized water and 5.0% by weight emulsifier dispersion from Preparation Example 1 was metered at a mass flow rate of 77.5 kg/h in parallel to the metering of the melts.

The rotary speed of the toothed-ring dispersing unit was 9000 rpm.

After leaving the toothed-ring dispersing unit the resulting emulsion cooled rapidly using a pipe cooler. The resulting suspension had a z-average particle size of 12.9 μm (measured using the Malvern laser diffraction instrument) and a solids content of 37.5% by weight (one hour/130° Celsius).

The suspension was fully sedimentation-stable and had outstanding transport and application properties. Moreover, it was outstandingly suitable for the preparation of powder coating materials.

The suspension was sprayed in a spraying tower such that the temperature of the particles did not rise above 40° C. The temperature of the stream of drying air was 110° C. The water content of the powder coating material of the invention was below 0.5% by weight. Its average particle size was 25 μm.

The powder coating material of the invention was stable in storage and in transit and showed no tendency to cake. Its fluidity and its application properties were outstanding. It gave smooth, highly glossy, scratch-resistant, flexible, hard, and chemical-resistant clearcoats having outstanding adhesion properties.

What is claimed is:

1. A continuous process for preparing a powder coating slurry or a powder coating material by emulsification of their constituents comprising
   (1) preparing at least one liquid component (A) comprising at least one binder in a reaction vessel by a method selected from the group consisting of continuous addition polymerization, polycondensation and combinations thereof,
   (2) discharging the liquid component (A) continuously from the reaction vessel and conveying it into a mixing unit in which it is mixed continuously with at least one liquid component (B) comprising at least one additional starting material of the powder slurry or powder coating material, to give a liquid component (C), and
   (3) conveying the liquid component (C) continuously into a dispersing unit in which it is emulsified in a continuously supplied aqueous medium (C), to give an aqueous emulsion (E) of liquid particles, and subsequently either preparing a powder slurry (F) by
   (4) cooling the emulsion (E), to form a suspension (F) of dimensionally stable particles, and
or preparing a powder coating material (G) by
   (5) isolating the dimensionally stable particles directly from the aqueous emulsion (E) or the suspension (F).

2. The process as claimed in claim 1, wherein the reaction vessel is selected from the group consisting of a stirred tank, stirred tank cascade, tube reactor loop reactor, Taylor reactor, extruder, and combinations thereof.

3. The process as claimed in claim 2, wherein the reaction vessel is a Taylor reactor.

4. The process as claimed in claim 1, wherein the binders are selected from the group consisting of random, alternating and block, linear, branched, and comb addition (co) polymers of olefinically unsaturated monomers, and polycondensation resins and mixtures thereof.

5. The process as claimed in claim 4, wherein the binders (A) are selected from the group consisting of addition (co)polymers of olefinically unsaturated monomers.

6. The process as claimed in claim 5, wherein the binders (A) are selected from the group of the (meth)acrylate copolymers.

7. The process as claimed in claim 1, wherein the additional starting material is selected from the group consisting of crosslinking agents.

8. The process as claimed in claim 1, wherein the at least one of the liquid components (A) and (B) further comprises at least one additive selected from the group consisting of pigments, emulsifiers, and liquid and solid additives and mixtures thereof.

9. The process as claimed in claim 1, wherein a stirred tank, extruder or static mixer is used as mixing unit.

10. The process as claimed in claim 1, wherein an inline dissolver is used as dispersing unit.

11. The process as claimed in claim 10, wherein the inline dissolver is a toothed-ring dispersing unit comprising at least one cylindrical arrangement of at least two comminutor rings wherein one ring is a stator and one ring is a rotor seated on holders, in mutual embrace, and rotatable in opposite directions relative to one another, and a working gap resulting from the relative movement between stator and rotor having walls extending nonparallelwise with respect to one another.

12. The process as claimed in claim 1, wherein the residence time of the liquid components (A), (B), and (C) and of the aqueous medium (D) in the dispersing unit is from 0.5 to 20 seconds.

13. The process as claimed in claim 1, wherein the dimensionally stable particles are isolated from the suspension (F) by spray drying or freeze drying.

14. The process as claimed in claim 1, wherein the dimensionally stable particles are isolated from the suspension (F) by pressure release.

15. The process as claimed in claim 1, wherein the aqueous medium (D) comprises at least one emulsifier.

16. The process as claimed in claim 15, wherein the aqueous solution of the emulsifier at the critical micelle concentration (CMC) has a surface tension >30 mN/m.

17. The process as claimed in claim 16, wherein the emulsifier is selected from the group of copolymers prepared, by single-stage or multistage free-radical copolymerization in an aqueous medium of
   (a) at least one olefinically unsaturated monomer and
   (b) at least one olefinically unsaturated monomer different than the olefinically unsaturated monomer (a) of the general formula (I)

$$R^1R^2CR^3R^4 \qquad (I)$$

in which the radicals $R^1$, $R^2$, $R^3$, and $R^4$ each independently of one another are selected from the group consisting of hydrogen atoms, substituted and unsubstituted alkyl, cycloalkyl, alkylcycloalkyl, cycloalkylalkyl, aryl, alkylaryl, cycloalkylaryl, arylalkyl and arylcycloalkyl radicals with the proviso that at least two of the variables $R^1$, $R^2$, $R^3$, and $R^4$ are selected from the group consisting of substituted and unsubstituted aryl, alkylaryl, and arylcycloalkyl radicals and mixtures thereof.

18. The process as claimed in claim 17, wherein at least one of the radicals $R^1$, $R^2$, $R^3$, and $R^4$ of the monomers (b) are selected from the group consisting of phenyl and napthyl radicals.

19. The process as claimed in claim 17, wherein at least one of the radicals are phenyl radicals.

20. The process as claimed in claim 17, wherein the substituents in the radicals $R^1$, $R^2$, $R^3$, and $R^4$ of the monomers (b) are selected from the group consisting of electron-withdrawing and electron-donating atoms and organic radicals.

21. The process as claimed in claim 20, wherein the substituents are selected from the group consisting of hydrogen atoms, nitrile, nitro, partially and fully halogenated alkyl, cycloalkyl, alkylcycloalkyl, cycloalkylalkyl, aryl, alkylaryl, cycloalkylaryl, arylalkyl and arylcycloalkyl radicals; aryloxy, alkyloxy, and cycloalkyloxy radicals; arylthio, alkylthio, and cycloalkylthio radicals, and primary, secondary and tertiary amino groups and mixtures thereof.

22. The process as claimed in claim 17, wherein at least one monomer (a) is selected from the group of the carboxyl-containing monomers (a3).

23. The process as claimed in claim 1, wherein the aqueous medium (D) comprises the suspension of at least one pigment.

24. The process as claimed in claim 23, wherein the pigments are selected from the group consisting of color pigments, effect pigments, fluorescent pigments, electrically conductive pigments, magnetically shielding pigments, metal powders, organic and inorganic, transparent and opaque fillers, and nanoparticles and mixtures thereof.

25. The process as claimed in claim 1, wherein the powder slurries (F) and powder coating materials (G) are curable by means selected from the group consisting of physical cure, thermal cure and actinic radiation and combinations thereof.

26. The process as claimed in claim 25, wherein the powder slurries (F) and the powder coating materials (G) are one-component systems.

* * * * *